Patented Dec. 23, 1924.

1,520,442

UNITED STATES PATENT OFFICE.

BUEL WELSH RICHARDS, OF BEACH, NORTH DAKOTA.

PRESERVATIVE COMPOSITION.

No Drawing.   Application filed August 30, 1923.   Serial No. 660,240.

*To all whom it may concern:*

Be it known that I, BUEL WELSH RICHARDS, a citizen of the United States, residing at Beach, in the county of Golden Valley and State of North Dakota, have invented new and useful Improvements in Preservative Composition, of which the following is a specification.

This invention relates to a preservative composition for preserving any natural product from the elements of destruction and more particularly for treating coal, wood, trees, and the like to preserve the same from disintegration, deterioration and loss of any of their natural constituents when exposed to the aforesaid elements.

The preservative composition consists of the ingredients and in substantially the proportions named as follows:

Paraffin wax_____five parts.
   Crude coal tar_____one part.
   Vinegar_____1/128th part.
   Bicarbonate of soda___1/256th part.

The method for perfecting the composition of the above ingredients consists in heating the same to a sufficient fluid state to provide for the thorough mixing of the ingredients, the vinegar and bicarbonate of soda in the meantime affecting the properties of the tar in such manner that the tar will intimately mix with the heated paraffin and will not become separated therefrom when the mixture is cooled.

In using the composition, the same is melted by heat in a suitable container and the material, such as coal or wood is submerged therein and retained until sufficiently coated with the melted composition, after which the material is removed and allowed to cool. In applying the composition to trees and the like the composition also is melted by heat and applied to the tree in any suitable and desired manner. The paraffin wax prevents the absorption of air and moisture by the treated article, and in the case of wood, trees and the like the tar repels all insects and other destructive enemies of plant life.

Practical experiments particularly with lignite coal treated with my composition have produced gratifying results in that the coal so treated has remained in the open and subjected to a temperature ranging from 20 degrees below zero to 90 degrees above and under snow or rain for six months at a time without deteriorating.

While the composition above mentioned is preferably used as an entirety in treating coal and other products, yet I have also found that satisfactory results can be obtained by the use of paraffin wax alone, the various products to be preserved being dipped in a vessel containing the liquid wax after which they are removed and permitted to dry. As is well known, insects, rats, mice and etc. will readily eat paraffin wax and the attacks of such animal life upon the coating of the article to be preserved destroy the same and expose the article to the deteriorating effects of the atmosphere. It is therefore deemed advisable where the products are to be preserved for any considerable length of time, or would likely be exposed to the attacks of animals and insects above mentioned, to employ the additional ingredients coal tar, vinegar and bicarbonate of soda, as aforestated to protect the coating from destruction.

While the invention has been described in its preferred form, yet I reserve the right to make such changes as fairly fall within the spirit and scope of the following claims.

Having described my invention, what I claim as new and desire to secure by Letters Patent is:—

1. The herein described preservative composition formed by mixing wax, tar, acetic acid and sodium carbonate.

2. The herein described preservative composition formed by mixing paraffin, tar, acetic acid and sodium carbonate.

3. The herein described preservative formed by mixing 5 parts of paraffin wax, 1 part tar, 1/128 part of a weak solution of acetic acid and 1/256 part of a salt.

In testimony whereof I affix my signature.

BUEL WELSH RICHARDS.